(12) United States Patent
Yoshimura et al.

(10) Patent No.: US 10,117,451 B2
(45) Date of Patent: Nov. 6, 2018

(54) BEER-FLAVORED BEVERAGE

(71) Applicant: KAO CORPORATION, Tokyo (JP)

(72) Inventors: Kenji Yoshimura, Suginami-ku (JP); Hideyuki Takatsu, Mihama-ku (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/737,578

(22) PCT Filed: Sep. 28, 2015

(86) PCT No.: PCT/JP2015/077368
§ 371 (c)(1),
(2) Date: Dec. 18, 2017

(87) PCT Pub. No.: WO2016/203662
PCT Pub. Date: Dec. 22, 2016

(65) Prior Publication Data
US 2018/0153192 A1    Jun. 7, 2018

(30) Foreign Application Priority Data

Jun. 19, 2015  (JP) ................. 2015-124129
Jul. 13, 2015  (JP) ................. 2015-139580

(51) Int. Cl.
A23L 2/38    (2006.01)
A23L 2/66    (2006.01)
A23L 2/56    (2006.01)
A23L 2/00    (2006.01)

(52) U.S. Cl.
CPC ....... *A23L 2/56* (2013.01); *A23L 2/00* (2013.01); *A23L 2/38* (2013.01); *A23V 2002/00* (2013.01); *A23V 2250/064* (2013.01); *A23V 2250/1614* (2013.01); *A23V 2250/2132* (2013.01)

(58) Field of Classification Search
CPC ..... A23L 2/56; A23L 2/66; A23L 2/68; A23L 2/38; A23V 2250/064
USPC ................ 426/72, 330.4, 590, 592, 656
See application file for complete search history.

(56) References Cited

U.S. PATENT DOCUMENTS

| 2007/0231428 A1 | 10/2007 | Mensour et al. |
| 2011/0217431 A1 | 9/2011 | Ido et al. |
| 2011/0256298 A1* | 10/2011 | Stuchlik et al. |
| 2014/0272006 A1 | 9/2014 | Schuh et al. |
| 2014/0328993 A1 | 11/2014 | Teranishi et al. |
| 2016/0309754 A1 | 10/2016 | Teranishi et al. |

FOREIGN PATENT DOCUMENTS

| JP | 11-199480 A | 7/1999 |
| JP | 2009-125067 A | 6/2009 |
| JP | 2009-531046 A | 9/2009 |
| JP | 2010-22221 A | 2/2010 |
| JP | WO 2010/035869 A1 | 4/2010 |
| JP | 2011-217706 A | 11/2011 |
| JP | 2012-170369 A | 9/2012 |
| JP | 2012-183063 A | 9/2012 |
| JP | 2013-34452 A | 2/2013 |
| JP | WO 2013/077292 A1 | 5/2013 |
| JP | 2014-94004 A | 5/2014 |
| JP | 2014-138582 A | 7/2014 |
| JP | 2014-161292 A | 9/2014 |
| JP | 2014-161294 A | 9/2014 |
| JP | 2014-166168 A | 9/2014 |
| JP | 2014-195478 A | 10/2014 |
| JP | 2015-27309 A | 2/2015 |
| JP | 2016-515812 A | 6/2016 |
| JP | 5998263 B1 | 9/2016 |
| WO | WO 2007/113284 A1 | 10/2007 |
| WO | WO 2014/152558 A2 | 9/2014 |

OTHER PUBLICATIONS

Koseki, H., et al., "Effect of Sugars on Decomposition and Browning of Vitamin C during Heating Storage", Nippon Shokuhin Kagaku Kogaku Kaishi, Journal of the Japanese Society for Food Science and Technology, 2001, vol. 48 No. 4, pp. 268-276 (with unedited computer generated English translation).

International Search Report dated Dec. 22, 2015 in PCT/JP2015/077368 filed Sep. 28, 2015.

Japanese Office Action dated Feb. 5, 2016 in JP2015-190123 filed Sep. 28, 2015 (with English translation).

* cited by examiner

*Primary Examiner* — Helen F Heggestad
(74) *Attorney, Agent, or Firm* — Oblon, McClelland, Maier & Neustadt, L.L.P.

(57) ABSTRACT

Provided is a beer-taste beverage, including: (A) proline; and (B) dehydroascorbic acid, in which: a mass ratio of the component (B) to the component (A), [(B)/(A)], is from 0.001 to 1,000; the beer-taste beverage has a pH of from 2 to 5; and the beer-taste beverage has a content of ethanol of less than 1 mass %.

13 Claims, No Drawings

BEER-FLAVORED BEVERAGE

FIELD OF THE INVENTION

The present invention relates to a beer-taste beverage.

BACKGROUND OF THE INVENTION

Beverages, such as a beer and a sparkling alcohol, have been diversifying year by year, and various commercial products in accordance with lifestyles have been placed on the market. Of those, a beer-taste beverage whose flavor, taste, smoothness through the throat or the like be similar to those of a typical beer beverage, in order to fulfill consumers' needs has been demanded more and more, and various investigations have been made for further improving the preference of the beer-taste beverage. For example, there has been known a non-alcoholic beverage having paper odor suppressed by incorporating a water-soluble dietary fiber and vitamin C, and controlling the content of the water-soluble dietary fiber and the ratio of vitamin C to the water-soluble dietary fiber within specific ranges (Patent Document 1). In addition, there has been reported anon-alcoholic beer-taste beverage obtained by incorporating sodium gluconate into a beverage containing a sweetener, an acidulant, and a bittering agent to suppress its variations in sweetness, sourness, and bitterness (Patent Document 2). In addition, it has been reported that the incorporation of a beer taste and flavor-imparting agent containing one or more selected from the group consisting of the group consisting of (A') natural flavors, (B') esters, (C') alcohols, (D') aldehydes, (E') ketones, (F') phenols, (G') ethers, (H') lactones, (I') hydrocarbons, (J') nitrogen-containing and/or sulfur-containing compounds, (K') acids, (L') a bittering agent, (M') an acidulant, (N') a sweetener, and (O') a spice into a beer-flavored beverage can impart the beer taste and flavor of a beer, such as an alcoholic feeling, a flavor, a rich taste rich taste, a refreshing attribute, and an exhilarating feeling, to the beer-flavored beverage to improve the preference of the beer-flavored beverage (Patent Document 3). As described above, it has been known that ascorbic acid is incorporated as an acidulant or the like into a beer-taste beverage.

[Patent Document 1] JP-A-2014-161292
[Patent Document 2] JP-A-2011-217706
[Patent Document 3] JP-A-2015-27309

SUMMARY OF THE INVENTION

The present invention provides a beer-taste beverage, comprising:
(A) proline; and
(B) dehydroascorbic acid, wherein:
a mass ratio of the component (B) to the component (A), [(B)/(A)], is from 0.001 to 1,000;
the beer-taste beverage has a pH of from 2 to 5; and
the beer-taste beverage has a content of ethanol of less than 1 mass %.

DETAILED DESCRIPTION OF THE INVENTION

A beer-taste beverage having a content of ethanol suppressed to less than 1 mass % involves problems in terms of rich taste and refreshing finish as compared to a typical beer beverage brewed by fermentation with yeast or the like. The inventors of the present invention found that a beer-taste beverage having a low pH was particularly liable to cause problems in terms of taste and flavor, such as rich taste.

The present invention relates to a beer-taste beverage improved in rich taste and refreshing finish.

The inventors of the present invention found that a beer-taste beverage having satisfactory rich taste and satisfactory refreshing finish was obtained by incorporating proline and dehydroascorbic acid into a beer-taste beverage having a relative low pH, and controlling a mass ratio therebetween and an ethanol amount in the beverage within specific ranges.

According to the present invention, there can be provided a beer-taste beverage having satisfactory rich taste and satisfactory refreshing finish.

The term "beer-taste beverage" as used herein refers to a beverage having a taste similar to that of a typical beer beverage brewed by fermentation with yeast or the like, and no matter what the product name and labeling of a beverage are, the beverage is included in the beer-taste beverage as long as the beverage has a taste that recalls a beer in terms of flavor.

A beer-taste beverage of the present invention comprises proline as a component (A). Proline is an amino acid that brings together both sweetness and bitterness, and is a component present in, for example, malt obtained by germinating barley or soybeans. Proline may be derived from malt or soybeans, may be derived from a blending component except malt and soybeans, or may be newly added.

From the viewpoint of an improvement in rich taste, the content of the component (A) in the beer-taste beverage of the present invention is preferably 0.000001 mass % or more, more preferably 0.00001 mass % or more, more preferably 0.00005 mass % or more, even more preferably 0.0001 mass % or more, and from the viewpoint of the balance of taste and flavor, the content is preferably 0.01 mass % or less, more preferably 0.005 mass % or less, more preferably 0.001 mass % or less, even more preferably 0.0005 mass % or less. Such content of the component (A) in the beer-taste beverage of the present invention falls within the range of preferably from 0.000001 mass % to 0.01 mass %, more preferably from 0.00001 mass % to 0.005 mass %, more preferably from 0.00005 mass % to 0.001 mass %, even more preferably from 0.0001 mass % to 0.0005 mass %. The content of the component (A) may be measured by an analysis method suitable for the state of a measurement sample out of typically known amino acid analysis methods. Specifically, the content may be measured by a method described in Examples to be described later. At the time of the measurement, such a treatment as described below may be appropriately performed as required: the sample is freeze-dried in order that the content may be adapted to the detection region of an apparatus; or contaminants in the sample are removed in order that the size of the sample may be adapted to the resolution of the apparatus.

The beer-taste beverage of the present invention comprises dehydroascorbic acid as a component (B) for improving its rich taste and refreshing finish.

From the viewpoints of further improvements in rich taste and refreshing finish, the content of the component (B) in the beer-taste beverage of the present invention is preferably 0.000005 mass % or more, more preferably 0.00001 mass % or more, more preferably 0.00005 mass % or more, even more preferably 0.002 mass % or more, and from the viewpoint of the balance of taste and flavor, the content is preferably 0.14 mass % or less, more preferably 0.12 mass % or less, more preferably 0.1 mass % or less, even more preferably 0.08 mass % or less. Such content of the component (B) in the beer-taste beverage of the present invention falls within the range of preferably from 0.000005 mass % to 0.14 mass %, more preferably from 0.00001 mass % to 0.12 mass %, more preferably from 0.00005 mass % to 0.1 mass %, even more preferably from 0.002 mass % to 0.08 mass %.

The content of the component (B) may be measured by an analysis method suitable for the state of a measurement sample out of typically known dehydroascorbic acid analysis methods. Specifically, the content may be measured by a method described in Examples to be described later. At the time of the measurement, such a treatment as described below may be appropriately performed as required: the sample is freeze-dried in order that the content may be adapted to the detection region of an apparatus; or contaminants in the sample are removed in order that the size of the sample may be adapted to the resolution of the apparatus.

The mass ratio of the component (B) to the component (A), [(B)/(A)], in the beer-taste beverage of the present invention is from 0.001 to 1,000. From the viewpoints of further improvements in beer tastes, such as rich taste and refreshing finish, the mass ratio is preferably 0.005 or more, more preferably 0.01 or more, more preferably 0.05 or more, even more preferably 0.1 or more, and from the viewpoint of the balance of taste and flavor, the mass ratio is preferably 800 or less, more preferably 600 or less, more preferably 500 or less, more preferably 400 or less, more preferably 300 or less, more preferably 100 or less, more preferably 50 or less, even more preferably 30 or less. Such mass ratio [(B)/(A)] in the beer-taste beverage of the present invention falls within the range of preferably from 0.005 to 800, more preferably from 0.005 to 600, more preferably from 0.005 to 500, more preferably from 0.005 to 400, more preferably from 0.005 to 300, more preferably from 0.01 to 100, more preferably from 0.05 to 50, even more preferably from 0.1 to 30.

The beer-taste beverage of the present invention may comprise one or two or more of polyphenols selected from the group consisting of a flavonol, a flavanone, a flavanol, and sugar adducts thereof as a component (C). Thus, the rich taste and refreshing finish of the beer-taste beverage can be enhanced.

Examples of the flavonol include myricetin, quercetin, and kaempferol. Examples of the flavanone include hesperetin and naringenin. Examples of the flavanol include a non-polymer catechin and a polymer thereof, and the polymer of the non-polymer catechin may be, for example, a polymerized catechin, such as procyanidin. The term "non-polymer catechin" as used herein is a generic term including a non-gallate form, such as catechin, gallocatechin, epicatechin, or epigallocatechin, and a gallate form, such as catechin gallate, gallocatechin gallate, epicatechin gallate, or epigallocatechin gallate, and the content of the non-polymer catechin is defined on the basis of the total amount of the above-mentioned eight kinds of non-polymer catechins. At least one of the above-mentioned eight kinds of non-polymer catechins only needs to be incorporated.

Meanwhile, the sugar adduct refers to a product in which a sugar is bonded to a flavonol, a flavanone, or a flavanol, which is an aglycone, through a glucoside bond. The glucoside bond may be an O-glycoside or a C-glycoside, and is not particularly limited.

The sugar forming the glucoside bond varies depending on the kind of the aglycone, and examples thereof include: monosaccharides, such as glucose, galactose, rhamnose, xylose, arabinose, and apiose; disaccharides, such as rutinose, neohesperidose, sophorose, sambubiose, and laminaribiose; trisaccharides, such as gentiotriose, glucosylrutinose, and glucosylneohesperidose; and mixtures thereof.

In addition, the sugar adducts come in such a sugar adduct that a sugar is added to an aglycone as described in the foregoing and such a sugar adduct that a sugar is further added to the sugar adduct, and a mixture thereof is also permitted. A known method may be adopted for a reaction involving adding a sugar, and an example thereof is a method involving causing a glycosyltransferase to act on a flavonol sugar adduct in the presence of a sugar compound to glucosylate the adduct. For a specific operation method, reference may be made to, for example, WO 2006/070883 A1.

Specific examples of the flavonol glycoside include products each obtained by adding a sugar to an aglycone, such as kaempferol, quercetin, or myricetin, for example, isoquercitrin, rutin, and quercitrin, and may also include products each obtained by further adding a sugar thereto, for example, an isoquercitrin sugar adduct. The isoquercitrin sugar adduct is, for example, a compound in which one or more glucose molecules are bonded to a glucose residue of isoquercitrin through an α-1,4-bond. The number of the glucose molecules to be bonded is preferably from 1 to 15, more preferably from 1 to 10, even more preferably from 1 to 7.

Specific examples of the flavanone glycoside include products each obtained by adding a sugar to an aglycone, such as hesperetin or naringenin, for example, hesperidin and naringin, and may also include products each obtained by further adding a sugar thereto, for example, a hesperidin sugar adduct. The hesperidin sugar adduct is, for example, a compound in which one or more glucose molecules are bonded to a rutinose residue of hesperidin through an α-1,4-bond. The number of the glucose molecules to be bonded is preferably from 1 to 10, more preferably from 1 to 5, even more preferably 1.

A specific example of the flavanol glycoside may be a compound disclosed in JP-A-6-40883.

Of those, from the viewpoint of the enhancement of rich taste and refreshing finish, the component (C) is preferably one or two or more selected from the group consisting of isoquercitrin, an isoquercitrin sugar adduct, hesperidin, a hesperidin sugar adduct, a non-polymer catechin, and a polymerized catechin, more preferably one or two or more selected from the group consisting of isoquercitrin, an isoquercitrin sugar adduct, a hesperidin sugar adduct, a non-polymer catechin, and a polymerized catechin.

From the viewpoint of the enhancement of rich taste and refreshing finish, the content of the component (C) in the beer-taste beverage of the present invention is preferably 0.001 mass % or more, more preferably 0.005 mass % or more, more preferably 0.01 mass % or more, even more preferably 0.02 mass % or more, and from the viewpoint of the balance of taste and flavor, the content is preferably 0.5 mass % or less, more preferably 0.4 mass % or less, more preferably 0.3 mass % or less, more preferably 0.2 mass % or less, even more preferably 0.1 mass % or less. Such content of the component (C) in the beer-taste beverage of the present invention falls within the range of preferably from 0.001 mass % to 0.5 mass %, more preferably from 0.005 mass % to 0.4 mass %, more preferably from 0.01 mass % to 0.3 mass %, more preferably from 0.02 mass % to 0.2 mass %, even more preferably from 0.02 mass % to 0.1 mass %.

The content of the component (C) may be measured by an analysis method suitable for the state of the measurement sample out of typically known analysis methods. For example, the content of a flavonol and a sugar adduct thereof may be measured by a high-performance liquid chromatography method, the content of a flavanone and a sugar adduct thereof may be measured by the high-performance liquid chromatography method, and the content of a flavanol may be measured by an iron tartrate method or the high-performance liquid chromatography method. Specifically, the content may be analyzed by a method described in Examples to be described later. At the time of the measurement of the content, such a treatment as described below may be appropriately performed as required: the sample is freeze-dried in order that the content may be adapted to the detection region of an apparatus for liquid chromatography; or contaminants in the sample are removed in order that the size of the sample may be adapted to the resolution of the apparatus.

In addition, from the viewpoint of the enhancement of rich taste and refreshing finish, the mass ratio of the component (C) to the component (B), [(C)/(B)], in the beer-taste beverage of the present invention is preferably 1 or more, more preferably 5 or more, more preferably 10 or more, even more preferably 30 or more, and from the viewpoint of the balance of taste and flavor, the mass ratio is preferably 500 or less, more preferably 400 or less, more preferably 300 or less, even more preferably 200 or less. Such mass ratio [(C)/(B)] in the beer-taste beverage of the present invention falls within the range of preferably from 1 to 500, more preferably from 5 to 400, more preferably from 10 to 300, even more preferably from 30 to 200.

The beer-taste beverage of the present invention may comprise at least one selected from the group consisting of a carboxylic acid, an inorganic acid, and salts thereof as a component (D). Examples of the carboxylic acid include citric acid, gluconic acid, succinic acid, tartaric acid, lactic acid, fumaric acid, malic acid, adipic acid, phytic acid, and acetic acid, and examples of the inorganic acid may include hydrochloric acid and phosphoric acid. Examples of the salts of the carboxylic acid and the inorganic acid include alkali metal salts, such as a potassium salt and a sodium salt. One or two or more of the component (D) may be incorporated. Of those, from the viewpoints of rich taste and refreshing finish, the component (D) is preferably at least one selected from the group consisting of gluconic acid, citric acid, phosphoric acid, succinic acid, and salts thereof, more preferably at least one selected from the group consisting of gluconic acid, phosphoric acid, and salts thereof.

From the viewpoints of improvements in rich taste and refreshing finish, the content of the component (D) in the beer-taste beverage of the present invention is preferably 0.0001 mass % or more, more preferably 0.0005 mass % or more, even more preferably 0.001 mass % or more, and from the viewpoint of the balance of taste and flavor, the content is preferably 1 mass % or less, more preferably 0.5 mass % or less, even more preferably 0.1 mass % or less. Such content of the component (D) in the beer-taste beverage of the present invention falls within the range of preferably from 0.0001 mass % to 1 mass %, more preferably from 0.0005 mass % to 0.5 mass %, even more preferably from 0.001 mass % to 0.1 mass %. When the component (D) is in the form of a salt, the content of the component (D) is a value in terms of the amount of a free acid thereof.

The content of (E) ethanol in the beer-taste beverage of the present invention is less than 1 mass %. In order that the beverage may be provided as a non-alcoholic beer-taste beverage, the content of ethanol is preferably less than 0.7 mass %, more preferably less than 0.5 mass %, more preferably less than 0.3 mass %, even more preferably 0.00 mass %. The phrase "ethanol content is 0.00 mass %" is a concept including a case in which the content of ethanol is below a detection limit in less than two decimal places in the section "Analysis of Ethanol" described in Examples to be described later.

Further, the beer-taste beverage of the present invention may comprise a carbon dioxide gas as a component (F). From the viewpoint of an improvement in refreshing finish, the amount of the carbon dioxide gas to be injected in the beer-taste beverage of the present invention is, in terms of a gas volume (GV), preferably 1 v/v or more, more preferably 1.2 v/v or more, more preferably 1.5 v/v or more, more preferably 1.6 v/v or more, even more preferably 2.0 v/v or more, and from the viewpoint of the enhancement of rich taste, the amount is preferably 3 v/v or less, more preferably 2.9 v/v or less, more preferably 2.8 v/v or less, more preferably 2.7 v/v or less, even more preferably 2.6 v/v or less. The content of the component (F) in the beer-taste beverage of the present invention falls within the range of, in terms of a gas volume ratio, preferably from 1 v/v to 3 v/v, more preferably from 1.2 v/v to 2.9 v/v, more preferably from 1.5 v/v to 2.8 v/v, more preferably from 1.6 v/v to 2.7 v/v, even more preferably from 2.0 v/v to 2.6 v/v. The term "gas volume (GV)" as used herein refers to a ratio between the volume of the carbon dioxide gas dissolved in the beer-taste beverage at 1 atm and 0° C., and the volume of the beverage. The analysis of the component (F) may be performed in conformity with a method described in Examples to be described later.

The beer-taste beverage of the present invention may comprise a water-soluble dietary fiber as a component (G). The term "water-soluble dietary fiber" as used herein refers to a water-soluble component out of all polymer components mainly formed of a polysaccharide in food that are not digested by the digestive enzymes of humans (Ayano, Japan Food Science, 12, p. 27-37, 1988).

Examples of the water-soluble dietary fiber may include an indigestible dextrin, polydextrose, a branched maltodextrin, partially hydrolyzed guar gum, galactomannan, glucomannan, hyaluronic acid, an alginic acid salt, pectin, laminarin, fucoidin, carrageenan, and a linear glucan. One or two or more of the component (G) may be incorporated. Of those, from the viewpoint of the enhancement of rich taste, the component (G) is preferably an indigestible dextrin or polydextrose, more preferably an indigestible dextrin.

The beer-taste beverage of the present invention is not necessarily required to comprise the component (G) because a desired rich taste-improving effect is exhibited by incorporating proline and dehydroascorbic acid, and controlling the mass ratio therebetween within a specific range. The content of the component (G) in the beer-taste beverage of the present invention is preferably 5 mass % or less, more preferably 3 mass % or less, more preferably 1 mass % or less, more preferably 0.3 mass % or less, more preferably 0.1 mass % or less, more preferably 0.05 mass % or less, even more preferably 0.01 mass % or less, and may be 0 mass %. The content of the component (G) may be measured by applying the modified Prosky method in conformity with an analysis method disclosed in STANDARD TABLES OF FOOD COMPOSITION IN JAPAN, Fifth Revised and Enlarged Edition (Ministry of Education, Culture, Sports, Science and Technology).

The beer-taste beverage of the present invention may comprise at least one selected from the group consisting of an α-acid and an iso-α-acid as a component (H). Each of the α-acid and the iso-α-acid is a component having bitterness, and is a component present in, for example, a hop. Each of the α-acid and the iso-α-acid may be derived from a hop, may be derived from a blending component except a hop, or may be newly added. The term "α-acid" as used herein is a generic term for humulone, adhumulone, cohumulone, post-humulone, and prehumulone. In addition, the term "iso-α-acid" is a generic term for isohumulone, isoadhumulone, isocohumulone, isoposthumulone, and isoprehumulone.

The beer-taste beverage of the present invention is not necessarily required to comprise the component (H) because a desired rich taste-improving effect is exhibited by incorporating proline and dehydroascorbic acid, and controlling the mass ratio therebetween within a specific range. The content of the component (H) in the beer-taste beverage of the present invention is preferably 0.01 mass % or less, more preferably 0.005 mass % or less, more preferably 0.001 mass % or less, more preferably 0.0005 mass % or less, even more preferably 0.0001 mass % or less, and may be 0 mass %. The content of the component (H) is defined on the basis of the total amount of the above-mentioned five kinds of α-acids and the above-mentioned five kinds of iso-α-acids.

The pH (20° C.) of the beer-taste beverage of the present invention is from 2 to 5. From the viewpoint of an improvement in refreshing finish, the pH is preferably 2.5 or more, more preferably 3 or more, more preferably 3.2 or more, more preferably 3.3 or more, even more preferably 3.4 or more, and from the viewpoint of an improvement in rich taste, the pH is preferably 4.5 or less, more preferably 4 or less, even more preferably 3.9 or less. Such pH falls within the range of preferably from 2.5 to 4.5, more preferably from 3 to 4, more preferably from 3.2 to 4, more preferably from 3.3 to 4, even more preferably from 3.4 to 3.9.

The pH of the beer-taste beverage of the present invention is measured by: weighing about 100 mL of the beer-taste beverage in a 300-milliliter beaker; loading a stirrer piece into the beaker; vigorously stirring the beverage with a stirrer for 20 minutes to remove a carbon dioxide gas; and then adjusting the temperature of the residue.

The beer-taste beverage of the present invention is not necessarily required to comprise ascorbic acid as a component (I). That is, the mass ratio of the component (I) to the component (B), [(I)/(B)], in the beer-taste beverage of the present invention is preferably 10 or less, more preferably 5 or less, more preferably 1 or less, more preferably 0.5 or less, more preferably 0.3 or less, even more preferably 0.1 or less, and may be 0.

The beer-taste beverage of the present invention may comprise a sodium ion as a component (J). From the viewpoints of rich taste, refreshing finish, and the like, and from the viewpoint of foaming, the content of the component (J) in the beer-taste beverage of the present invention is preferably 0.001 mass % or more, more preferably 0.005 mass % or more, even more preferably 0.01 mass % or more, and from the viewpoint of the balance of taste and flavor, the content is preferably 0.5 mass % or less, more preferably 0.1 mass % or less, even more preferably 0.05 mass % or less. Such content of the component (J) in the beer-taste beverage of the present invention falls within the range of preferably from 0.001 mass % to 0.5 mass %, more preferably from 0.005 mass % to 0.1 mass %, even more preferably from 0.01 mass % to 0.05 mass %.

The beer-taste beverage of the present invention may further comprise one or a combination of two or more of additives, such as a flavor, a sweetener, a vitamin, a mineral, an antioxidant, an ester, an emulsifier, a preservative, and a quality stabilizer. The content of any such additive may be appropriately set to the extent that the object of the present invention is not impaired.

The beer-taste beverage of the present invention may be produced by, for example, blending the components (A) and (B), and as desired, any other component, and adjusting the mass ratio [(B)/(A)], pH, and ethanol concentration of the blend.

For example, a malt-derived raw material, such as wort or a malt extract, or a soybean-derived raw material, such as a soybean extract, may be blended for incorporating the component (A). The wort is obtained by saccharifying malt, and more specifically, the wort is obtained by: adding water to a winter cereal to germinate the winter cereal; drying the germinated product; adding hot water to the dried product; treating the mixture according to an ordinary method to decompose (saccharify) a starch material through the action of an enzyme in the winter cereal; and squeezing or extracting the decomposed product. Examples of the form of the wort include a liquid, a concentrate, and powder. In addition, wort obtained by saccharifying malt and then inoculating yeast to ferment the saccharified product may be used as the wort. However, non-fermented wort is preferred from the viewpoint that a non-alcoholic beverage is simply produced and from the viewpoint that the flavor of fresh malt is imparted to the beverage. The non-fermented wort may be obtained, for example, by: adding water to a winter cereal to germinate the winter cereal; drying the germinated product; and roasting the dried product as required, followed by extraction with hot water, or roasting and saccharifying the dried product as required, followed by extraction with hot water. The non-fermented wort also includes, for example, such wort that yeast is inoculated but alcohol fermentation is suppressed. The winter cereal to be used in the germination may be, for example, barley, such as two-rowed barley or six-rowed barley. In addition, examples of the germination method include a Kasten germination method, a Wanderhauf en germination method, a Flexibox germination method, a Tower germination method, and a Trommel germination method, and the germination method may be appropriately selected therefrom. In addition, the saccharification of the malt may be performed through the addition of a diastatic enzyme, such as α-amylase or glucoamylase.

In the present invention, a malt extract may also be used as the wort. The malt extract is prepared by, for example, concentrating wort.

In addition, for example, a plant extract containing a polyphenol, such as a tea extract, or a commercial polyphenol preparation may be blended for incorporating the component (C). An example of the tea extract is an extract obtained from a tea. For example, tea leaves (*Camellia sinensis*) selected from the group consisting of the genus *Camellia*, such as *C. sinensis* var. *sinensis* (including a Yabukita species), *C. sinensis* var. *assamica*, and hybrids thereof, are suitably used as the tea. The tea leaves may be roughly classified into an unfermented tea, a semi-fermented tea, and a fermented tea in accordance with their processing methods. Examples of the unfermented tea include green teas, such as green tea of middle grade (sencha), coarse green tea (bancha), powdered green tea (tencha), green tea fired inhot pans after a short withering (kamairicha), twig tea (kukicha), stem tea (boucha), and bud tea (mecha). In addition, examples of the semi-fermented tea include oolong teas, such as Tieguanyin (tekkannon), Se Zhuon (shikishu), Huangj in Gui, and WuYiRockTea. Further, examples of the fermented tea include black teas, such as Darjeeling, Assam, and Sri Lanka. Those teas may be used alone or in combination thereof. Of those, a green tea is suitable. In addition, a known method, such as stirring extraction or column extraction, may be adopted as an extraction method.

In addition, for example, a product commercially available as a catechin preparation may be used as the tea extract.

Examples of the commercial product include "POLYPHE-NON" manufactured by Mitsui Norin Co., Ltd., "TEA-FURAN" manufactured by Ito En, Ltd., and "SUNPHE-NON" manufactured by Taiyo Kagaku Co., Ltd.

In addition, a purified catechin preparation may be used as the catechin preparation. A purification method is, for example, one of the following methods (i) and (ii), or a combination of two or more of the methods.

(i) A method involving suspending a tea extract in water, or a mixture of water and a water-soluble organic solvent (for example, ethanol) (hereinafter referred to as "organic solvent aqueous solution"), and removing the resultant precipitate (for example, JP-A-2004-147508 and JP-A-2004-149416).

(ii) A method involving bringing a tea extract into contact with at least one of adsorbent selected from the group consisting of activated carbon, acid clay, and activated clay (for example, JP-A-2007-282568).

In each of the methods (i) and (ii), a tea extract subjected to a tannase treatment may be used as the tea extract, or the tannase treatment may be performed after the treatments in the methods (i) and (ii). The term "tannase treatment" as used herein refers to a treatment involving bringing the tea extract into contact with an enzyme having tannase activity.

A known method may be adopted as a specific operation method in the tannase treatment, and a method disclosed in JP-A-2004-321105 may be given as an example thereof.

A beer-taste beverage comes in a fermented beer-taste beverage and a non-fermented beer-taste beverage. The fermented beer-taste beverage is a beverage that passes a fermentation step during its production process. Meanwhile, the non-fermented beer-taste beverage includes a beverage that does not pass any fermentation step during its production process, and a beverage that passes a fermentation step during its production process but is suppressed in ethanol fermentation. In the present invention, the non-fermented beer-taste beverage is preferred from the viewpoint that the effects of the present invention are sufficiently elicited.

The beer-taste beverage of the present invention may be provided by being filled into a general packaging container, such as a metal can, a bottle, or a molded container mainly formed of polyethylene terephthalate (so-called PET bottle).

The beer-taste beverage of the present invention may be subjected to heat sterilization. A method for the heat sterilization is not particularly limited as long as the method complies with a condition specified by an applicable regulation (Food Sanitation Act in Japan). Examples of the method may include a retort sterilization method, a high-temperature short-time sterilization method (HTST method), an ultrahigh-temperature sterilization method (UHT method), and a post-filling sterilization method (pasteurization).

In addition, the method for the heat sterilization may be appropriately selected. For example, when a container filled with a beverage can be subjected to heat sterilization as it is (e.g., at from 60° C. to 140° C. for from 1 minute to 60 minutes) like a metal can or a bottle, retort sterilization or a post-filling sterilization method (pasteurization) may be adopted. In the case of the post-filling sterilization method (pasteurization), the heat sterilization can be performed, for example, at 65° C. for from 1 minute to 60 minutes, preferably at 65° C. for from 5 minutes to 30 minutes, more preferably at 65° C. for from 10 minutes to 20 minutes.

Meanwhile, when a container cannot be subjected to retort sterilization like as a PET bottle, for example, the following may be adopted: a beverage is subjected to heat sterilization in advance under the same sterilization conditions as those described above (e.g., at from 65° C. to 140° C. for from 0.1 second to 30 minutes, preferably at from 70° C. to 125° C. for from 1 second to 25 minutes, more preferably at from 75° C. to 120° C. for from 10 seconds to 20 minutes), and is subjected to aseptic filling, which involves filling the beverage into a container subjected to a sterilization treatment under an aseptic environment, or to hot-pack filling.

With regard to the embodiment described in the foregoing, the present invention further discloses the following beer-taste beverage and method.

<1>

A beer-taste beverage, comprising:

(A) proline; and (B) dehydroascorbic acid, wherein:

a mass ratio [(B)/(A)] of the component (B) to the component (A) is from 0.001 to 500;

the beer-taste beverage has a pH of from 2 to 5; and the beer-taste beverage has a content of ethanol of less than 1 mass %.

<2>

A method of improving the rich taste and refreshing finish of a beer-taste beverage, comprising:

blending (A) proline and (B) dehydroascorbic acid; and adjusting the mass ratio [(B)/(A)] of the component (B) to the component (A) to from 0.001 to 500, the pH of the beverage to from 2 to 5, and the content of ethanol thereof to less than 1 mass %.

<3>

The beer-taste beverage according to the above-mentioned item <1> or the method of improving the rich taste and refreshing finish of a beer-taste beverage according to the above-mentioned item <2>("the beer-taste beverage or the method of improving the rich taste and refreshing finish of a beer-taste beverage" is hereinafter referred to as "the beer-taste beverage or the like"), wherein the content of the component (A) is preferably 0.000001 mass % or more, more preferably 0.00001 mass % or more, more preferably 0.00005 mass % or more, even more preferably 0.0001 mass % or more, and is preferably 0.01 mass % or less, more preferably 0.005 mass % or less, more preferably 0.001 mass % or less, even more preferably 0.0005 mass % or less.

<4>

The beer-taste beverage or the like according to any one of the above-mentioned items <1> to <3>, wherein the content of the component (A) is preferably from 0.000001 mass % to 0.01 mass %, more preferably from 0.00001 mass % to 0.005 mass %, more preferably from 0.00005 mass % to 0.001 mass %, even more preferably from 0.0001 mass % to 0.0005 mass %.

<5>

The beer-taste beverage or the like according to any one of the above-mentioned items <1> to <4>, wherein the content of the component (B) is preferably 0.000005 mass % or more, more preferably 0.00001 mass % or more, more preferably 0.00005 mass % or more, even more preferably 0.002 mass % or more, and is preferably 0.14 mass % or less, more preferably 0.12 mass % or less, more preferably 0.1 mass % or less, even more preferably 0.08 mass % or less.

<6>

The beer-taste beverage or the like according to any one of the above-mentioned items <1> to <5>, wherein the content of the component (B) is preferably from 0.000005 mass % to 0.14 mass %, more preferably from 0.00001 mass % to 0.12 mass %, more preferably from 0.00005 mass % to 0.1 mass %, even more preferably from 0.002 mass % to 0.08 mass %.

<7>

The beer-taste beverage or the like according to any one of the above-mentioned items <1> to <6>, wherein the mass ratio of the component (B) to the component (A), [(B)/(A)], is preferably 0.005 or more, more preferably 0.01 or more, more preferably 0.05 or more, even more preferably 0.1 or more, and is preferably 300 or less, more preferably 100 or less, more preferably 50 or less, even more preferably 30 or less.

<8>

The beer-taste beverage or the like according to any one of the above-mentioned items <1> to <7>, wherein the mass ratio of the component (B) to the component (A), [(B)/(A)], is preferably from 0.005 to 300, more preferably from 0.01 to 100, more preferably from 0.05 to 50, even more preferably from 0.1 to 30.

<9>

The beer-taste beverage or the like according to any one of the above-mentioned items <1> to <8>, preferably further comprising one or two or more of polyphenols selected from the group consisting of a flavonol, a flavanone, a flavanol, and sugar adducts thereof as a component (C).

<10>

The beer-taste beverage or the like according to the above-mentioned item <9>, wherein the flavonol is preferably one or two or more selected from the group consisting of myricetin, quercetin, and kaempferol, the flavanone is preferably at least one selected from the group consisting of hesperetin and naringenin, the flavanol is preferably at least one selected from the group consisting of anon-polymer catechin and a polymer thereof, a flavonol glycoside is a product in which a sugar is added to kaempferol, quercetin, or myricetin (e.g., one or two or more selected from the group consisting of isoquercitrin, an isoquercitrin sugar adduct, rutin, and quercitrin), and a flavanone glycoside is preferably a product in which a sugar is added to hesperetin or naringenin (e.g., one or two or more selected from the group consisting of hesperidin, a hesperidin sugar adduct, and naringin).

<11>

The beer-taste beverage or the like according to the above-mentioned item <10>, wherein the non-polymer catechin is preferably one or two or more selected from the group consisting of catechin, gallocatechin, epicatechin, epigallocatechin, catechin gallate, gallocatechin gallate, epicatechin gallate, and epigallocatechin gallate.

<12>

The beer-taste beverage or the like according to any one of the above-mentioned items <9> to <11>, wherein the component (C) is preferably one or two or more selected from the group consisting of isoquercitrin, an isoquercitrin sugar adduct, hesperidin, a hesperidin sugar adduct, a non-polymer catechin, and a polymerized catechin, more preferably one or two or more selected from the group consisting of isoquercitrin, the isoquercitrin sugar adduct, the hesperidin sugar adduct, the non-polymer catechin, and the polymerized catechin.

<13>

The beer-taste beverage or the like according to any one of the above-mentioned items <9> to <12>, wherein the content of the component (C) is preferably 0.001 mass % or more, more preferably 0.005 mass % or more, more preferably 0.01 mass % or more, even more preferably 0.02 mass % or more, and is preferably 0.5 mass % or less, more preferably 0.4 mass % or less, more preferably 0.3 mass % or less, more preferably 0.2 mass % or less, even more preferably 0.1 mass % or less.

<14>

The beer-taste beverage or the like according to any one of the above-mentioned items <9> to <13>, wherein the content of the component (C) is preferably from 0.001 mass % to 0.5 mass %, more preferably from 0.005 mass % to 0.4 mass %, more preferably from 0.01 mass % to 0.3 mass %, more preferably from 0.02 mass % to 0.2 mass %, even more preferably from 0.02 mass % to 0.1 mass %.

<15>

The beer-taste beverage or the like according to any one of the above-mentioned items <9> to <14>, wherein the mass ratio of the component (C) to the component (B), [(C)/(B)], is preferably 1 or more, more preferably 5 or more, more preferably 10 or more, even more preferably 30 or more, and is preferably 500 or less, more preferably 400 or less, more preferably 300 or less, even more preferably 200 or less.

<16>

The beer-taste beverage or the like according to any one of the above-mentioned items <9> to <15>, wherein the mass ratio of the component (C) to the component (B), [(C)/(B)], is preferably from 1 to 500, more preferably from 5 to 400, more preferably from 10 to 300, even more preferably from 30 to 200.

<17>

The beer-taste beverage or the like according to any one of the above-mentioned items <1> to <16>, preferably further comprising at least one selected from the group consisting of a carboxylic acid, an inorganic acid, and salts thereof as a component (D).

<18>

The beer-taste beverage or the like according to the above-mentioned item <17>, wherein the component (D) is preferably at least one selected from the group consisting of citric acid, gluconic acid, succinic acid, tartaric acid, lactic acid, fumaric acid, malic acid, adipic acid, phytic acid, acetic acid, hydrochloric acid, phosphoric acid, and salts thereof (e.g., alkali metal salts, such as a potassium salt and a sodium salt), more preferably at least one selected from the group consisting of gluconic acid, citric acid, phosphoric acid, succinic acid, and salts thereof, even more preferably at least one selected from the group consisting of gluconic acid, phosphoric acid, and salts thereof.

<19>

The beer-taste beverage or the like according to the above-mentioned item <17> or <18>, wherein the content of the component (D) is preferably 0.0001 mass % or more, more preferably 0.0005 mass % or more, even more preferably 0.001 mass % or more, and is preferably 1 mass % or less, more preferably 0.5 mass % or less, even more preferably 0.1 mass % or less.

<20>

The beer-taste beverage or the like according to any one of the above-mentioned items <17> to <19>, wherein the content of the component (D) is preferably from 0.0001 mass % to 1 mass %, more preferably from 0.0005 mass % to 0.5 mass %, even more preferably from 0.001 mass % to 0.1 mass %.

<21>

The beer-taste beverage or the like according to any one of the above-mentioned items <1> to <20>, wherein the content of (E) ethanol is preferably less than 0.7 mass %, more preferably less than 0.5 mass %, more preferably less than 0.3 mass %, even more preferably 0.00 mass %.

<22>

The beer-taste beverage or the like according to any one of the above-mentioned items <1> to <21>, which is preferably a non-alcoholic beer-taste beverage.

<23>

The beer-taste beverage or the like according to any one of the above-mentioned items <1> to <22>, preferably further comprising a carbon dioxide gas as a component (F).

<24>

The beer-taste beverage or the like according to the above-mentioned item <23>, wherein the content of (F) the carbon dioxide gas in terms of a gas volume (GV) is preferably 1 v/v or more, more preferably 1.2 v/v or more, more preferably 1.5 v/v or more, more preferably 1.6 v/v or more, even more preferably 2.0 v/v or more, and is preferably 3 v/v or less, more preferably 2.9 v/v or less, more preferably 2.8 v/v or less, more preferably 2.7 v/v or less, even more preferably 2.6 v/v or less.

<25>

The beer-taste beverage or the like according to the above-mentioned item <23> or <24>, wherein the content of (F) the carbon dioxide gas in terms of a gas volume (GV) is preferably from 1 v/v to 3 v/v, more preferably from 1.2 v/v to 2.9 v/v, more preferably from 1.5 v/v to 2.8 v/v, more preferably from 1.6 v/v to 2.7 v/v, even more preferably from 2.0 v/v to 2.6 v/v.

<26>

The beer-taste beverage or the like according to any one of the above-mentioned items <1> to <25>, preferably further comprising a water-soluble dietary fiber as a component (G).

<27>

The beer-taste beverage or the like according to the above-mentioned item <26>, wherein the water-soluble dietary fiber is preferably at least one selected from the group consisting of an indigestible dextrin, polydextrose, a branched maltodextrin, partially hydrolyzed guar gum, galactomannan, glucomannan, hyaluronic acid, an alginic acid salt, pectin, laminarin, fucoidin, carrageenan, and a linear glucan, more preferably at least one selected from the group consisting of an indigestible dextrin and polydextrose, even more preferably an indigestible dextrin.

<28>

The beer-taste beverage or the like according to the above-mentioned item <26> or <27>, wherein the content of the component (G) is preferably 5 mass % or less, more preferably 3 mass % or less, more preferably 1 mass % or less, more preferably 0.3 mass % or less, more preferably 0.1 mass % or less, more preferably 0.05 mass % or less, even more preferably 0.01 mass % or less, and may be 0 mass %.

<29>

The beer-taste beverage or the like according to any one of the above-mentioned items <1> to <28>, preferably further comprising at least one selected from the group consisting of an α-acid and an iso-α-acid as a component (H).

<30>

The beer-taste beverage or the like according to the above-mentioned item <29>, wherein the α-acid is preferably at least one selected from the group consisting of humulone, adhumulone, cohumulone, posthumulone, and prehumulone, and the iso-α-acid is preferably at least one selected from the group consisting of isohumulone, isoadhumulone, isocohumulone, isoposthumulone, and isoprehumulone.

<31>

The beer-taste beverage or the like according to the above-mentioned item <29> or <30>, wherein the content of the component (H) is preferably 0.01 mass % or less, more preferably 0.005 mass % or less, more preferably 0.001 mass % or less, more preferably 0.005 mass % or less, even more preferably 0.0001 mass % or less, and may be 0 mass %.

<32>

The beer-taste beverage or the like according to any one of the above-mentioned items <1> to <31>, wherein the pH (20° C.) of the beer-taste beverage is preferably 2.5 or more, more preferably 3 or more, more preferably 3.2 or more, more preferably 3.3 or more, even more preferably 3.4 or more, and is preferably 4.5 or less, more preferably 4 or less, even more preferably 3.9 or less.

<33>

The beer-taste beverage or the like according to any one of the above-mentioned items <1> to <32>, wherein the pH (20° C.) of the beer-taste beverage is preferably from 2.5 to 4.5, more preferably from 3 to 4, more preferably from 3.2 to 4, more preferably from 3.3 to 4, even more preferably from 3.4 to 3.9.

<34>

The beer-taste beverage or the like according to any one of the above-mentioned items <1> to <33>, wherein the mass ratio of (1) ascorbic acid to (B) dehydroascorbic acid, [(1)/(B)], is preferably 10 or less, more preferably 5 or less, more preferably 1 or less, more preferably 0.5 or less, more preferably 0.3 or less, even more preferably 0.1 or less, and may be 0.

<35>

The beer-taste beverage according to any one of the above-mentioned items <1> to <34>, preferably further comprising a sodium ion as a component (J).

<36>

The beer-taste beverage or the like according to the above-mentioned item <35>, wherein the content of the component (J) is preferably 0.001 mass % or more, more preferably 0.005 mass % or more, even more preferably 0.01 mass % or more, and is preferably 0.5 mass % or less, more preferably 0.1 mass % or less, even more preferably 0.05 mass % or less.

<37>

The beer-taste beverage or the like according to the above-mentioned item <35> or <36>, wherein the content of the component (J) is preferably from 0.001 mass % to 0.5 mass %, more preferably from 0.005 mass % to 0.1 mass %, even more preferably from 0.01 mass % to 0.05 mass %.

<38>

The beer-taste beverage or the like according to any one of the above-mentioned items <1> to <37>, preferably comprising one or two or more of additives selected from the group consisting of a flavor, a sweetener, a vitamin, a mineral, an antioxidant, an ester, an emulsifier, a preservative, and a quality stabilizer.

<39>

The beer-taste beverage or the like according to any one of the above-mentioned items <1> to <38>, wherein the beer-taste beverage is preferably a fermented beer-taste beverage or a non-fermented beer-taste beverage, more preferably the non-fermented beer-taste beverage.

<40>

The beer-taste beverage or the like according to any one of the above-mentioned items <1> to <39>, wherein the beer-taste beverage is preferably a beer-taste beverage packaged in a container.

<41>

The beer-taste beverage or the like according to the above-mentioned item <40>, wherein the container is preferably a metal can, a bottle, or a molded container using polyethylene terephthalate as a main component (so-called PET bottle).

<42>

The beer-taste beverage or the like according to any one of the above-mentioned items <1> to <41>, wherein the beer-taste beverage is preferably subjected to heat sterilization.

<43>

The beer-taste beverage or the like according to the above-mentioned item <42>, wherein the heat sterilization is preferably one which complies with a condition specified by an applicable regulation (Food Sanitation Act in Japan), more preferably retort sterilization, high-temperature short-time sterilization (HTST), ultrahigh-temperature sterilization (UHT), or post-filling sterilization (pasteurization).

<44>

The beer-taste beverage or the like according to the above-mentioned item <43>, wherein when the heat sterilization is the retort sterilization or the post-filling sterilization, the heat sterilization is preferably performed at from 60° C. to 140° C. for from 1 minute to 60 minutes.

<45>

The beer-taste beverage or the like according to the above-mentioned item <43>, wherein when the heat sterilization is the post-filling sterilization (pasteurization), the heat sterilization is performed preferably at 65° C. for from 1 minute to 60 minutes, more preferably at 65° C. for from 5 minutes to 30 minutes, even more preferably at 65° C. for from 10 minutes to 20 minutes.

<46>

The beer-taste beverage or the like according to the above-mentioned item <42> or <43>, wherein the beer-taste beverage is subjected to heat sterilization preferably at from 65° C. to 140° C. for from 0.1 second to 30 minutes, more preferably at from 70° C. to 125° C. for from 1 second to 25 minutes, even more preferably at from 75° C. to 120° C. for from 10 seconds to 20 minutes, and is subjected to aseptic filling, which involves filling the beverage into a container subjected to a sterilization treatment under an aseptic environment, or to hot-pack filling.

EXAMPLES

1. Analysis of Proline

A sample is filtered with a membrane filter and the resultant filtrate is subjected to LC/MS/MS measurement, followed by the determination of the amount of proline by a gradient method. Respective conditions are as described below.

LC/MS/MS: UltiMate 3000/TSQ Quantum Access MAX (Thermo Fisher Scientific)
Column: Atlantis T3 (4.6 mm$\varphi$×150 mm, 5 μm)
Mobile phase: aqueous solution of formic acid/methanol
Monitor ion: m/z 116.22 $[M+H]^+$
Ion spray voltage: 3 kV
Evaporation temperature: 500° C.
Capillary temperature: 280° C.
Flow rate: 1.0 mL/min
Injection volume: 10 μL
Column temperature: 40° C.

2. Analysis of Dehydroascorbic Acid

A high-performance liquid chromatograph (model LC-20AT, manufactured by Shimadzu Corporation) is used as an analytical instrument. The names and model numbers of the constituent units of the apparatus are as described below.

Detector: ultraviolet-visible absorption spectrophotometer, SPD-10AV (manufactured by Shimadzu Corporation)
Column: Senshupak Silica-1100-N, ($\varphi$4.6 mm×100 mm (manufactured by Senshu Scientific Co., Ltd.)
Analysis conditions are as described below.
Mobile phase: mixed liquid of ethyl acetate, hexane, acetic acid, and water (60:40:5:0.05)
Flow rate: 1.5 mL/min
Preset column oven temperature: 35° C.
Wavelength: 495 nm A sample is precisely weighed and then diluted with a 2% thiourea-5% metaphosphoric acid solution in a measuring cylinder to 50 mL total. After the diluted liquid has been filtered, 1 mL of the filtrate is fractionated, and 1 mL of a 2% thiourea-5% metaphosphoric acid solution and 2 mL of a 5% metaphosphoric acid solution are added thereto. Further, 0.5 mL of 2% 2,4-dinitrophenylhydrazine-4.5 mol/L sulfuric acid is added to the mixture, and then an osazone production reaction is performed at 50° C. for 1 hour. Next, 3 mL of ethyl acetate is added to the resultant, and the mixture is shaken for 60 minutes so that an osazone may be transferred into ethyl acetate. The osazone thus obtained is subjected to analysis.

3. Analysis of Carboxylic Acid 5 mL of 5% perchloric acid is added to 10 g of a sample, and a constant volume of 50 mL is obtained by adding water to the mixture. A solution obtained by diluting the resultant with water as required so that a concentration may fall within the ranges of the calibration curves of various carboxylic acids is used as a test solution. The test solution is injected into the high-performance liquid chromatograph and its electrical conductivity is measured, followed by the calculation of the concentrations of the various carboxylic acids from the calibration curves.

Separation column: Shim-pack SCR-102H (manufactured by Shimadzu Corporation)
Mobile phase: 5 mmol/L p-toluenesulfonic acid
Detection reagent: 5 mmol/L p-toluenesulfonic acid, 100 μmol/L EDTA, 20 mmol/L Bis-Tris buffer
Injection volume: 10 μL
Flow rate: 0.8 mL/min
Electrical conductivity detector: CDD-10AVP (manufactured by Shimadzu Corporation)
Temperature: 40° C.

4. Analysis of Polyphenol (1) Analysis of Non-Polymer Catechin

A sample solution was filtered through a filter (0.45 μm), and was analyzed with a high-performance liquid chromatograph (model SCL-10AVP, manufactured by Shimadzu Corporation) mounted with an octadecyl group-introduced packed column for a liquid chromatograph L-Columnn™ ODS (4.6 mm$\varphi$×250 mm: manufactured by Chemicals Evaluation and Research Institute, Japan) at a column temperature of 35° C. by a gradient method. The analysis was performed by using a distilled water solution containing 0.1 mol/L of acetic acid as the solution A of a mobile phase and an acetonitrile solution containing 0.1 mol/L of acetic acid as the solution B of the mobile phase under the conditions of a sample injection volume of 20 μL and a UV detector wavelength of 280 nm.

| Concentration Gradient Conditions (vol %) | | |
| --- | --- | --- |
| Time | Mobile phase A | Mobile phase B |
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |
| 49 min | 97% | 3% |
| 62 min | 97% | 3% |

(2) Analysis of Total Amount of Polymerized Catechin and Non-Polymer Catechin
(i) Preparation of Reagent
(1) Preparation of Iron Tartrate Reagent
0.50 g of ferrous sulfate heptahydrate and 2.50 g of (+) potassium sodium tartrate tetrahydrate were collected in a 500-milliliter measuring flask, and the mixture was diluted with ion-exchanged water in the measuring flask.
(2) Preparation of Phosphate Buffer
20.00 g of disodium hydrogen phosphate dihydrate and 2.90 g of potassium dihydrogen phosphate were collected in a 2,000-milliliter measuring flask, and the mixture was diluted with ion-exchanged water in the measuring flask. The pH of the solution was adjusted to from 7.5 to 7.6. When the pH was more than 7.6, a 0.9 g/100 mL aqueous solution of potassium dihydrogen phosphate dihydrate was added to adjust the pH, and when the pH was less than 7.5, a 1.2 g/100 mL aqueous solution of potassium dihydrogen phosphate was added to adjust the pH.
(ii) Apparatus and Instrument
(1) Spectrophotometer (U-2010; manufactured by Hitachi, Ltd.)
(2) Cell made of quartz (10 mm×10 mm)
(3) 25-milliliter, 100-milliliter, 200-milliliter, 500-milliliter, and 2,000-milliliter measuring flasks
(4) 1-milliliter, 5-milliliter, 10-milliliter, 20-milliliter, and 30-milliliter volumetric pipettes
(5) 1-milliliter, 3-milliliter, and 5-milliliter micropipettes
(iii) Analysis Conditions
(1) Measurement wavelength: 540 nm
(2) Temperature: 20° C.±2° C.
(iv) Operation
(1) Creation of Calibration Curve
(i) About 0.5 g of ethyl gallate was dried for from 2 hours to 3 hours before its use.
(ii) 0.2 g of the dried ethyl gallate was collected in a 200-milliliter measuring flask, and was diluted with ion-exchanged water in the measuring flask (100 mg/100 mL standard solution).
(iii) Various standard solutions having concentrations of 5 mg/100 mL, 10 mg/100 mL, 20 mg/100 mL, and 30 mg/100 mL were each prepared by using the standard solution obtained in the (ii) in a 100-milliliter measuring flask.
(iv) 5 mL of each of the standard solutions obtained in the (iii) was collected in a 25-milliliter measuring flask, and 5 mL of the iron tartrate reagent was added to the solution, followed by the dilution of the mixture with the phosphate buffer in the measuring flask. In addition, a solution in which no standard solution was added was prepared as a blank.
(v) The absorbances of the resultant solutions were measured with a spectrophotometer and a calibration curve was created.
The calibration curve was created with reference to the following guidelines, and when any one of the parameters deviated from the guideline, the calibration curve was adjusted again.

R2: from 0.9995 to 1.0000
Calibration curve slope: 34.5±0.4
Intercept: 0.3 or less
(2) Measurement of Absorbance of Sample
(i) A spectrophotometer was subjected to zero correction with ion-exchanged water.
(ii) A predetermined amount of a sample was collected in a 25-milliliter measuring flask, and 5 mL of the iron tartrate reagent was added to the sample, followed by the dilution of the mixture with the phosphate buffer in the measuring flask. After that, the absorbance of the resultant was measured. The absorbance was measured within 40 minutes after the color development of the resultant.
(3) Analysis of Polymerized Catechin
The content of a polymerized catechin was determined by subtracting the analysis result obtained in the section "(1) Analysis of Non-polymer Catechin" from the analysis result obtained in the section "(2) Analysis of Total Amount of Polymerized Catechin and Non-polymer Catechin."
(4) Analysis of Hesperidin and Sugar Adduct Thereof
The analysis of hesperidin and a sugar adduct thereof is performed with a high-performance liquid chromatograph manufactured by Hitachi, Ltd. mounted with a column Cadenza CD-C18 (4.6 mmφ×150 mm, 3 μm) manufactured by Imtakt Corporation at a column temperature of 40° C. by a gradient method. A 0.05 mol/L aqueous solution of acetic acid is used as the solution C of a mobile phase and acetonitrile is used as the solution D of the mobile phase, and each of the solutions is delivered at 1.0 mL/min. Gradient conditions are as described below.

| Concentration Gradient Conditions (vol %) | | |
| --- | --- | --- |
| Time | Mobile phase C | Mobile phase D |
| 0 min | 85% | 15% |
| 20 min | 80% | 20% |
| 35 min | 10% | 90% |
| 50 min | 10% | 90% |
| 40.1 min | 85% | 15% |
| 60 min | 85% | 15% |

A sample injection volume is set to 10 μL, and the amount of hesperidin and the sugar adduct thereof is determined from an absorbance at a detector wavelength of 283 nm.
(5) Analysis of Isoquercitrin and Sugar Adduct Thereof
The analysis of isoquercitrin and a sugar adduct thereof is performed by a high-performance liquid chromatography (HPLC) method in accordance with the following method.
LC-20AD (manufactured by Shimadzu Corporation) is used as an analytical instrument.
The apparatus construction of the analytical instrument is as described below.
Detector: ultraviolet-visible absorption spectrophotometer SPD-20A (manufactured by Shimadzu Corporation)
Column: YMC-Pack ODS-AAA12S05-1506WT, φ6 mm×150 mm (manufactured by YMC Co., Ltd.)
Analysis conditions are as described below.
Column temperature: 40° C.
Mobile phase: mixed liquid of water, acetonitrile, 2-propanol, and acetic acid (200:38:2:1)
Flow rate: 1.0 mL/min
Sample injection volume: 10 μL
Measurement wavelength: 360 nm
A sample for analysis is prepared by the following procedure.

1 g of a specimen was weighed and 1 mL of methanol was added thereto. Further, a constant volume of 10 mL was obtained by adding a mixed liquid of methanol and water (1:1) to the mixture. Thus, a sample solution was obtained. The prepared sample solution is subjected to high-performance liquid chromatographic analysis.

In addition, a solution having a known concentration is prepared by using the standard product of isoquercitrin, and a calibration curve is created by subjecting the solution to high-performance liquid chromatographic analysis. The amount of isoquercitrin and a sugar adduct thereof in the sample solution is determined by using isoquercitrin as an indicator. That is, the amount of isoquercitrin and the sugar adduct thereof in the sample solution is determined by: determining the molar concentration of each of isoquercitrin and the sugar adduct thereof in the HPLC analysis of the sample solution from the calibration curve; and calculating the content (mass %) of each substance from its molecular weight.

5. Analysis of Ethanol

The analysis of ethanol is performed in accordance with the following gas chromatographic method.

GC-14B (manufactured by Shimadzu Corporation) is used as an analytical instrument.

The apparatus configuration of the analytical instrument is as described below.

Detector: FID

Column: Gaskuropack 55, 80 mesh to 100 mesh, φ3.2 mm×3.1 m

Analysis conditions are as described below.

Temperature: sample injection port and detector: 250° C., column: 130° C.

Gas pressure: helium (carrier gas): 140 kPa, hydrogen: 60 kPa, air: 50 kPa

Injection volume: 2 μL

A sample for analysis is prepared by the following procedure.

5 g of a sample is weighed and a constant volume of 25 mL is obtained by adding water to the sample. The solution is subjected to disc filtration to prepare a sample solution. The prepared sample solution is subjected to gas chromatographic analysis.

6. Analysis of Carbon Dioxide Gas

A method disclosed in the section "3-1-2 Inspection of Internal Gas Pressure" in Volume VI of "Latest Soft Drinks (Latest Soft Drinks Editorial Committee, Korin Co., Ltd., published on Sep. 30, 2003)" was used. The method is specifically as described below.

(1) Before measurement, a sample was warmed to 20° C. in a thermostat so that a liquid temperature was uniformized.
(2) The sample obtained in the (1) was loaded into a measuring machine [Kyoto Electronics Manufacturing Co., Ltd., Gas Volume Analyzer GVA-500A], and a snifting operation (involving opening a snifting valve to return a gauge to atmospheric pressure) was performed. Air in a head space was released by performing the snifting operation.
(3) Next, the sample was vigorously shaken, and when a gauge pressure showed a constant value, the value was read and the temperature of the sample was measured, followed by the determination of a gas volume from a chart (gas volume chart for snifting).

7. Analysis of Sodium Ion Amount 5 mL of 10% hydrochloric acid is added to 2 g of a sample, and the mixture is evaporated to dryness on a water bath. Further, 5 mL of 10% hydrochloric acid is added to the resultant, and the mixture is warmed. After that, the total amount of the mixture is filtered into a measuring flask, and a constant volume is obtained by adding water to the mixture. The resultant is diluted with 1% hydrochloric acid to a proper concentration so that the concentration may fall within the range of a calibration curve. A constant volume is obtained by adding 2.5 mL of a 20,000 ppm strontium solution to the diluted liquid. Thus, a test solution is obtained. The absorbance of the test solution is measured with an atomic absorption spectrophotometer, and the amount of sodium is determined from the calibration curve created in advance.

Atomic absorption spectrophotometer: AA-7000 (manufactured by Shimadzu Corporation)

Flame: air-acetylene

Measurement wavelength: 589.0 nm

8. Measurement of pH

The pH of a sample was measured with a pH meter (HORIBA Compact pH Meter, manufactured by Horiba, Ltd.) while its temperature was adjusted to 20° C. When a carbon dioxide gas was contained in a beverage, about 100 mL of the sample was weighed in a 300-milliliter beaker, a stirrer piece was loaded into the beaker, and the carbon dioxide gas was removed by stirring the sample with a stirrer for 20 minutes. After that, the measurement was performed while the temperature was adjusted to 20° C.

9. Sensory Evaluation

Three expert panelists evaluated each beer-taste beverage for its "rich taste" and "refreshing finish" on the basis of the following criteria, and then the score of each beer-taste beverage was determined by consultation.

(1) Evaluation Criteria for Rich Taste

An evaluation was performed on the following five-point scale in which the "rich taste" of the beer-taste beverage of Example 3 was scored 3 and the "rich taste" of the beer-taste beverage of Comparative Example 1 was scored 1.

Score 5: A beverage has strong rich taste.
    4: A beverage has somewhat strong rich taste.
    3: A beverage has rich taste.
    2: A beverage has somewhat weak rich taste.
    1: A beverage has weak rich taste.

(2) Evaluation Criteria for Refreshing Finish

An evaluation was performed on the following five-point scale in which the "refreshing finish" of the beer-taste beverage of Example 3 was scored 3 and the "refreshing finish" of the beer-taste beverage of Comparative Example 1 was scored 1.

Score 5: A beverage has extremely satisfactory refreshing finish.
    4: A beverage has satisfactory refreshing finish.
    3: A beverage provides a feeling of refreshing finish, though the refreshing finish is slightly weak.
    2: A beverage has weak refreshing finish.
    1: A beverage has no refreshing finish.

10. Evaluation of Foaming

With regard to a foaming (mL), 50 mL of each beverage cooled to 5° C. was poured from a portion 10 cm above the bottom portion of a measuring cylinder having a volume of 100 mL (IWAKI, PYREX (trademark)) toward the center of the bottom portion, and the amount (mL) of bubbles produced at that time was measured.

Preparation Example 1

Green Tea Extract I 200 g of POLYPHENON G (manufactured by Mitsui Norin Co., Ltd.) was dispersed in 800 g of a 95 mass % ethanol aqueous solution at 25° C. under the stirring condition of 250 r/min, and 100 g of acid clay (MIZUKAACE

600, manufactured by Mizusawa Industrial Chemicals, Ltd.) was loaded into the mixture. After that, stirring was continued for about 10 minutes. Next, the resultant was filtered through #2 filter paper. After that, 16 g of activated carbon was added to the filtrate and the mixture was filtered through #2 filter paper again. Next, the filtrate was re-filtered through a 0.2-micrometer membrane filter. Next, ethanol was distilled off from the filtrate at 40° C. under reduced pressure, and a non-polymer catechin concentration was adjusted to 15 mass % with ion-exchanged water. Thus, a purified green tea extract I was obtained.

Examples 1 to 14, Comparative Example 1, and Reference Example 1

Respective components shown in Table 1 were mixed and dissolved in ion-exchanged water. Next, the solution was diluted with carbonated water having a GV of 3.1 v/v, which had been cooled to 4° C., so that a total amount became 350 g. The diluted solution was filled into an aluminum can having a volume of 350 mL, and was then subjected to heat sterilization by pasteurization. The sterilization was performed under the conditions of 65° C. and 20 minutes. The analysis results and sensory evaluation results of the resultant beer-taste beverages are collectively shown in Table 1. Examples 1, 2, 4, and 5 were evaluated for their foamings. While the foamings of Example 1, Example 2, and Example 4 were 6 mL, 10 mL, and 6 mL, respectively, the foamings of Example 5 was 24 mL. In addition, the beer-taste beverage of Example 5 had a sodium ion content of 0.025 mass %, and the beer-taste beverage of Example 14 had a sodium ion content of 0.048 mass %.

TABLE 1

| Formulation | Example 1 | Example 2 | Example 3 | Example 4 | Example 5 | Example 6 | Example 7 | Example 8 | Example 9 | Example 10 | Example 11 | Example 12 | Example 13 | Example 14 | Comparative Example 1 | Reference Example 1 |
|---|---|---|---|---|---|---|---|---|---|---|---|---|---|---|---|---|
| Malt extract[1] | 0.15 | 0.15 | 0.15 | 0.15 | 0.15 | 0.15 | 0.15 | 0.15 | 0.15 | 0.15 | 0.15 | 0.15 | 0.005 | 0.15 | 0.15 | 0.15 |
| Dehydroascorbic acid | 0.001 | 0.0001 | 0.01 | 0.001 | 0.001 | 0.001 | 0.001 | 0.001 | 0.001 | 0.001 | 0.001 | 0.00001 | 0.001 | 0.001 | 0 | 0.001 |
| Green tea extract I[2] | 0 | 0 | 0 | 0 | 0 | 1.2 | 0.27 | 0 | 0 | 0 | 0 | 0 | 0 | 0 | 0 | 0 |
| Oolong tea extract[3] | 0 | 0 | 0 | 0 | 0 | 0 | 0 | 0.43 | 0 | 0 | 0 | 0 | 0 | 0 | 0 | 0 |
| Apple extract[4] | 0 | 0 | 0 | 0 | 0 | 0 | 0 | 0 | 0.18 | 0 | 0 | 0 | 0 | 0 | 0 | 0 |
| Hesperidin preparation[5] | 0 | 0 | 0 | 0 | 0 | 0 | 0 | 0 | 0 | 0.17 | 0 | 0 | 0 | 0 | 0 | 0 |
| Isoquercitrin preparation[6] | 0 | 0 | 0 | 0 | 0 | 0 | 0 | 0 | 0 | 0 | 0.55 | 0 | 0 | 0 | 0 | 0 |
| 50% gluconic acid | 0.023 | 0.025 | 0.011 | 0 | 0.025 | 0.041 | 0.027 | 0.144 | 0.023 | 0.045 | 0 | 0.029 | 0.01 | 0.03 | 0.031 | 0 |
| 75% phosphoric acid | 0 | 0 | 0 | 0.003 | 0 | 0 | 0 | 0 | 0 | 0 | 0 | 0 | 0 | 0 | 0 | 0 |
| NaCl | 0 | 0 | 0 | 0 | 0.063 | 0 | 0 | 0 | 0 | 0 | 0 | 0 | 0 | 0.12 | 0 | 0 |
| Ion-exchanged water | Balance | Balance | Balance | Balance | Balance | Balance | Balance | Balance | Balance | Balance | Balance | Balance | Balance | Balance | Balance | Balance |
| Carbonated water (GV: 3.1 v/v) | 75 | 75 | 75 | 75 | 75 | 75 | 75 | 75 | 75 | 75 | 75 | 75 | 75 | 75 | 75 | 75 |
| Total | 100 | 100 | 100 | 100 | 100 | 100 | 100 | 100 | 100 | 100 | 100 | 100 | 100 | 100 | 100 | 100 |
| Analysis value (A) Proline (mass %) | 0.00032 | 0.00032 | 0.00032 | 0.00032 | 0.00032 | 0.00032 | 0.00032 | 0.00032 | 0.00032 | 0.00032 | 0.00032 | 0.00001 | 0.00001 | 0.00032 | 0.00032 | 0.00032 |
| (B) Dehydroascorbic acid (mass %) | 0.001 | 0.0001 | 0.01 | 0.001 | 0.001 | 0.001 | 0.001 | 0.001 | 0.001 | 0.001 | 0.001 | 0.00001 | 0.001 | 0.001 | 0 | 0.001 |
| (C) Polyphenol (mass %) | 0 | 0 | 0 | 0 | 0 | 0.187 | 0.042 | 0.070 | 0.037 | 0.119 | 0.083 | 0 | 0 | 0 | 0 | 0 |
| (D) Carboxylic acid and inorganic acid (mass %) | 0.0115 | 0.0125 | 0.0055 | 0.00225 | 0.0125 | 0.0205 | 0.0135 | 0.072 | 0.0115 | 0.0225 | 0 | 0.0145 | 0.005 | 0.015 | 0.0155 | 0 |
| (E) Ethanol (mass %) | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| (F) Carbon dioxide gas GV (v/v) | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 |
| Mass ratio [(B)/(A)] | 3.2 | 0.3 | 31.7 | 3.2 | 3.2 | 3.2 | 3.2 | 3.2 | 3.2 | 3.2 | 3.2 | 0.032 | 95.2 | 3.2 | 0.0 | 3.2 |

TABLE 1-continued

| | Example 1 | Example 2 | Example 3 | Example 4 | Example 5 | Example 6 | Example 7 | Example 8 | Example 9 | Example 10 | Example 11 | Example 12 | Example 13 | Exampel 14 | Comparative Example 1 | Reference Example 1 |
|---|---|---|---|---|---|---|---|---|---|---|---|---|---|---|---|---|
| Mass ratio [(C)/(B)] | 0 | 0 | 0 | 0 | 0 | 187.2 | 42.12 | 70.09 | 36.54 | 119 | 82.5 | 0 | 0 | 0 | 0 | 0 |
| pH | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 5.2 |
| E-valuation Rich taste | 2 | 2 | 3 | 3 | 3 | 5 | 3 | 5 | 3 | 4 | 3 | 1.5 | 1.5 | 4 | 1 | 4 |
| Refreshing finish | 2 | 2 | 3 | 3 | 3 | 3 | 4 | 3 | 3 | 3 | 4 | 1.5 | 2.5 | 3 | 1 | 4 |

[1] MALT EXTRACT POWDER 100 LIGHT, Molda, proline: 0.21 mass %
[2] Flavanols (15 mass % of non-polymer catechin + 0.6 mass % of polymer catechin): 15.6 mass %
[3] SUN OOLONG POWDER, Suntory Holdings Limited, flavanols (5.7 mass % of non-polymer catechin + 10.6 mass % of polymerized catechin): 16.3 mass %
[4] APPLIN AFPOMM 9051, Unitec Foods Co., Ltd., flavanols (20.3 mass % of polymerized catechin)
[5] αG HESPERIDIN H, Toyo Sugar Refining Co., Ltd., flavanone and a sugar adduct thereof (70 mass % of hesperetin glycoside)
[6] SAN MELLIN POWDER C-10, San-Ei Gen F.F.I., Inc., flavonols and sugar adducts thereof (15 mass % of enzymatically modified isoquercitrin)

As can be seen from Table 1, a beer-taste beverage having satisfactory rich taste and satisfactory refreshing finish is obtained by incorporating proline and dehydroascorbic acid into a beer-taste beverage having a low ethanol amount and a low pH, and controlling a mass ratio therebetween within a specific range.

The invention claimed is:

1. A flavored beverage, comprising:
    (A) proline;
    (B) 0.000005 to 0.14 mass % of dehydroascorbic acid, and
    (J) 0.001 to 0.05 mass % of a sodium ion, wherein:
    a mass ratio of the component (B) to the component (A), [(B)/(A)], is from 0.001 to 1,000;
    the beer-taste beverage has a pH of from 2 to 5; and
    the beer-taste beverage has a content of ethanol of less than 1 mass %.

2. The flavored beverage according to claim 1, wherein a content of the component (B) is from 0.000005 mass % to 0.12 mass %.

3. The flavored beverage according to claim 1, further comprising (C) one or two or more of polyphenols selected from the group consisting of a flavonol, a flavanone, a flavanol, and sugar adducts thereof.

4. The flavored beverage according to claim 3, wherein a content of the component (C) is from 0.001 mass % to 0.5 mass %.

5. The flavored beverage according to claim 3, wherein a mass ratio of the component (C) to the component (B), [(C)/(B)], is from 1 to 500.

6. The flavored beverage according to claim 1, wherein a content of the component (A) is from 0.000001 mass % to 0.01 mass %.

7. The flavored beverage according to claim 1, further comprising (D) at least one selected from the group consisting of a carboxylic acid, an inorganic acid, and salts thereof.

8. The flavored beverage according to claim 7, wherein a content of the component (D) is from 0.0001 mass % to 1 mass %.

9. The flavored beverage according to claim 1, which is a non-fermented beer flavored beverage.

10. The flavored beverage according to claim 1, wherein a content of (E) ethanol is 0.00 mass %.

11. The flavored beverage according to claim 1, wherein the beer flavored beverage has a content of (F) a carbon dioxide gas of from 1 v/v to 3 v/v in terms of a gas volume (GV).

12. The flavored beverage according to claim 1, which is a beer flavored beverage packaged in a container.

13. The flavored beverage according to claim 12, wherein the container is a metal can.

* * * * *